(12) United States Patent  (10) Patent No.: US 7,848,388 B2
Tudosoiu  (45) Date of Patent: Dec. 7, 2010

(54) MINIMIZING ESTIMATION TIME FOR RAKE FINGERS WITH HELP OF A SPEED SENSOR

(75) Inventor: Bogdan Tudosoiu, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1138 days.

(21) Appl. No.: 11/463,028

(22) Filed: Aug. 8, 2006

(65) Prior Publication Data

US 2008/0037612 A1    Feb. 14, 2008

(51) Int. Cl.
*H04B 1/00*     (2006.01)
(52) U.S. Cl. ....................................... 375/147
(58) Field of Classification Search ......... 375/147–148, 375/150, 285, 340, 343, 346; 455/63.1, 67.13
See application file for complete search history.

(56) References Cited

U.S. PATENT DOCUMENTS

| | | | |
|---|---|---|---|
| 5,223,844 A * | 6/1993 | Mansell et al. | 342/357.07 |
| 5,574,984 A * | 11/1996 | Reed et al. | 455/69 |
| 5,659,578 A * | 8/1997 | Alamouti et al. | 375/261 |
| 6,370,183 B1 | 4/2002 | Newson et al. | |
| 6,373,882 B1 * | 4/2002 | Atarius et al. | 375/148 |
| 6,515,977 B2 | 2/2003 | Bi et al. | |
| 2001/0034254 A1* | 10/2001 | Ranta | 455/574 |
| 2004/0029547 A1 | 2/2004 | Kakchi | |
| 2004/0053612 A1 | 3/2004 | Janardhanan | |

FOREIGN PATENT DOCUMENTS

| | | |
|---|---|---|
| EP | 1 096 711 | 5/2001 |
| EP | 1 139 578 | 10/2001 |

OTHER PUBLICATIONS

International Preliminary Report on Patentability for International Application No. PCT/IB2007/000302 dated Nov. 24, 2008.
Written Opinion for International Application No. PCT/IB2007/000302 dated Jul. 19, 2007.
K. Murali Krishna, et al.; "A Simplified Single Correlator Rake Receiver for CDMA Communications"; Transactions of Engineering, Computing and Technology, vol. 8; Oct. 2005; pp. 106-109.
Anders Nilsson et al.; "A fully programmable Rake-receiver architecture for multi-standard baseband processors"; Department of Electrical Engineering; Linkoping University, Linkoping, Sweden; andni,erite,dake@isy.liu.se.
Bernard Sklar; "Rayleigh Fading Channels in Mobile Digital Communication Systems Part I: Characterization"; IEEE Communications Magazine; Jul. 1997, pp. 90-100.
Professor Randy H. Katz; "CS 294-7: Radio Propagation"; University of California, Berkeley, Berkeley, CA. 1996.

* cited by examiner

*Primary Examiner*—Khanh C Tran
(74) *Attorney, Agent, or Firm*—Renner, Otto, Boisselle & Sklar, LLP

(57) ABSTRACT

An electronic equipment includes a RAKE receiver that includes at least one finger having a settable delay, a transducer operable to provide a signal indicative of motion of the electronic equipment, and a delay estimator circuit operative to calculate a duration between fading nulls of a received signal based on the motion signal of the electronic equipment. The time delay of the at least one finger is set based on the duration between fading nulls.

21 Claims, 5 Drawing Sheets

Rx signal strength versus distance $$\tau(R) = \frac{\lambda}{v} \frac{\rho}{\sqrt{2\pi}}$$

MINIMIZING ESTIMATION TIME FOR RAKE FINGERS WITH HELP OF A SPEED SENSOR

TECHNICAL FIELD OF THE INVENTION

The present invention relates generally to electronic equipment and, more particularly, to a system and method for minimizing the estimation time for RAKE fingers of a RAKE receiver.

DESCRIPTION OF THE RELATED ART

Wireless communications have become prevalent in business, personal, and other applications, and as a result the technology for such communications continues to advance in various areas. One such advancement includes the use of spread spectrum communications, including that of code division multiple access ("CDMA"). In such communications, a user station (e.g., a hand held cellular phone) communicates with a base station, where typically the base station corresponds to a "cell". CDMA systems are characterized by simultaneous transmission of different data signals over a common channel by assigning each signal a unique code.

CDMA includes various different operating modes and standards such as a 1xRTT mode sometimes referred to in the art as Radio Configuration 3 and 4 ("RC 3&4"), and an IS95 mode sometimes referred to in the art as Radio Configuration 1 and 2 ("RC 1&2"). In addition, CDMA continues to advance along with corresponding standards that have brought forth a third generation CDMA also referred to as 3G cellular. 3G cellular includes two standards, namely, IS2000 which is Qualcom based and supports IS95 in one operational mode, and a wideband CDMA which is also referred to as WCDMA and which has a 3GPP standard.

With respect to base station operations in various CDMA systems, the base station generally transmits, receives and manages signals to/from numerous different user stations. Typically, the user stations are mobile and for this and other reasons the signals received by the base station from the user station (and vice-versa) are subject to various effects imposed on the signal as they are communicated between the respective stations. In addition, CDMA signals are modulated, or "spread" with one or more pseudo-noise ("PN") codes, such as a short code, a long code, and possibly a Walsh code based on the type of symbol being communicated as well as the operational mode. Accordingly, and with the advancement and evolution of CDMA, base stations and user stations are known in the art to include sufficient circuitry to demodulate or "de-spread" such codes from the communication. The prior art typically includes multiplication and accumulation circuits that are physically duplicated to process different received signals at the same time, thereby deciphering the symbol information encoded in those signals. This process is commonly performed by a device that is part of the base and user stations and referred to as a RAKE receiver; the RAKE is said to have fingers and each finger is assigned to process an incoming signal. The decoded symbols may represent multiple paths from a single transmission by the same base or user station, as further detailed below. Conventional base and user stations often include circuitry to separately identify and process these multiple paths and also to combine the signals in an effort to improve signal performance (e.g., as measured by signal-to-noise ratio, bit error rate, or some other type of measure).

Typically, RAKE receivers operate in conjunction with a delay searcher and a delay tracker. The delay searcher analyzes a received signal and finds the delays, and these delays are assigned to the rake fingers. However, in mobile telecommunications the channels may be subject to additional fading due to the motion of the receiver. A delay tracker tracks the delays assigned by the searcher between channel searches. Thus, while the searcher looks over a wide range of delays, the trackers look over a smaller range surrounding the assigned delays.

SUMMARY

In a WCDMA communication system, it is desirable to quickly set the RAKE fingers to enable efficient decoding of the received signals. One problem encountered in setting the RAKE fingers is the impact of Raleigh fading, which can cause strong nulls in the received signal. Rayleigh fading is due to phase-interference fading caused by multi-path "replicas" of the transmitted signal. Rayleigh fading can comprise nulls superimposed on a transmission signal and, in severe cases, may include nulls on the order of 30-40 dB. Rayleigh fading is influenced by the velocity of the receiving unit as well as the operating frequency of the receiving unit (e.g., the velocity of the user station).

Conventionally, the time delay between RAKE fingers is estimated based on a search of carrier replicas due to fading every half or quarter chip rate (up to 20 µsec from the carrier). The carrier replicas can be generated by the environment (e.g., signal reflections off structures) and/or flat fading. When severe Rayleigh fading is present, the replica signals detected by the fingers may not be discernable, or the process of searching these signals may take significant time, resulting in performance degradation of the communication system.

The present invention minimizes the estimation time for RAKE fingers by determining velocity of a user station. This can be accomplished, for example, by including a sensor in the user station that enables the determination of user station's velocity. The sensor may be a velocity sensor, an accelerometer, or any other sensor that enables a velocity of the user station to be determined. Alternatively, velocity may be determined by tracking a change in location of the user station (e.g., via GPS tracking or the like). The velocity of the user station is utilized in a calculation of the average duration of a fade, and this information then is used to set the RAKE fingers. As a result, searching is not performed by the RAKE fingers in areas where nulls are significant relative to signal levels.

According to one aspect of the invention, there is provided an electronic equipment that includes a RAKE receiver for receiving a signal, said receiver including at least one finger having a settable time delay; a transducer operable to provide a signal indicative of motion of the electronic equipment, and a delay estimator circuit operative to calculate a duration between fading nulls of the signal based on the motion signal. The time delay of the at least one finger is set based on the duration between fading nulls.

According to another aspect of the invention, the duration between fading nulls can be calculated using the formula $$ADF = \frac{\sqrt{2}\lfloor e^{R^2} - 1\rfloor}{\beta vR}.$$

According to another aspect of the invention, the time delay of the at least one finger can be set such that the at least one finger avoids searching in areas of the signal where fading nulls are present that have a magnitude greater than a predefined level.

According to another aspect of the invention, the electronic equipment can further include a path probability circuit operative to receive the calculated duration between fading nulls and to set the time delay of the at least one finger based on the duration between fading nulls.

According to another aspect of the invention, the electronic equipment can further include a motion signal processing circuit operable to determine a velocity of the electronic equipment from the motion signal.

According to another aspect of the invention, the transducer may be operable to generate a motion signal that corresponds to acceleration and/or deceleration of the electronic equipment.

According to another aspect of the invention, the motion signal processing circuit can include a signal conditioning circuit to filter out signals that do not meet a predetermined threshold.

According to another aspect of the invention, the signal conditioning circuit can include a low pass filter.

According to another aspect of the invention, the motion signal processing circuit may be operative to provide a motion signal indicative of duration of the motion, amplitude of the motion, and/or frequency of the motion.

According to another aspect of the invention, the motion signal processing circuit can include at least one of a low pass filter, a threshold detector, an amplitude detector or a frequency detector.

According to another aspect of the invention, the transducer can be an accelerometer, a velocimeter, a GPS receiver or a signal detector.

According to another aspect of the invention, the transducer may be operable to detect at least one of acceleration, velocity, position, rotation or proximity.

According to another aspect of the invention, the electronic equipment can be a mobile phone.

According to another aspect of the invention, the electronic equipment can be at least one of a personal audio device, a personal video device or a personal digital assistant.

According to another aspect of the invention, a method of minimizing estimation time for at least one finger of a RAKE receiver in electronic equipment includes: determining a velocity of the electronic equipment; using the velocity to determine a duration between fading nulls of a signal receivable by the RAKE receiver; and setting a time delay of the at least one finger based on the duration between fading nulls.

According to another aspect of the invention, using the velocity to determine the duration between fading nulls can include using the formula $$ADF = \frac{\sqrt{2}\left[e^{R^2} - 1\right]}{\beta v R}$$

to determine the duration.

According to another aspect of the invention, the step of setting can include setting the time delay such that the at least one finger avoids searching in areas of the signal where fading nulls are present that have a magnitude greater than a predefined level.

According to another aspect of the invention, determining a velocity can include using a transducer in the electronic equipment, said transducer operable to detect motion of the electronic equipment.

According to another aspect of the invention, determining a velocity can include: generating a motion signal that corresponds to acceleration and/or deceleration of the electronic equipment; and determining the velocity of the electronic equipment from the motion signal.

According to another aspect of the invention, determining a velocity can include using a GPS receiver to determine the velocity.

According to another aspect of the invention, determining the velocity can include filtering out signals that do not meet a predetermined threshold.

According to another aspect of the invention, a computer program embodied on a computer readable medium and operable in electronic equipment for minimizing estimation time for at least one finger of a RAKE receiver in the electronic equipment, includes: code that determines a velocity of the electronic equipment; code that uses the velocity to determine a duration between fading nulls of a signal receivable by the RAKE receiver; and code that sets a time delay of the at least one finger based on the duration between fading nulls.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
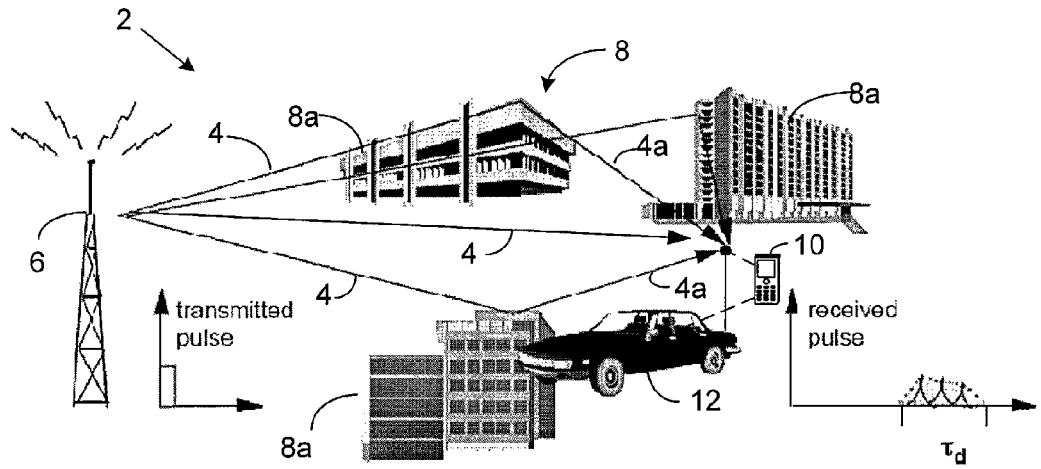
FIG. 1 illustrates an exemplary mobile communication system wherein the communication signal exhibits multiple reflective paths between the base station and the user station.

The present invention will now be described with reference to the drawings, wherein like reference numerals are used to refer to like elements throughout.

The term "electronic equipment" includes portable radio communication equipment. The term "portable radio communication equipment," which herein after is referred to as a "mobile radio terminal," "mobile phone," "mobile device," or "mobile terminal", and the like, includes all equipment such as mobile telephones, pagers, communicators, i.e., electronic organizers, personal digital assistants (PDAs), smartphones, portable communication apparatus or the like.

In the present application, the invention is described primarily in the context of a mobile phone. However, it will be appreciated that the invention is not intended to be limited to a mobile phone and can be any type of electronic equipment.

In a wireless mobile communication system, a signal can travel from transmitter to receiver over multiple reflective paths. This phenomenon is referred to as multi-path propagation, and can cause fluctuations in the received signal's amplitude, phase and angle of arrival, giving rise to the terminology multi-path fading. Multi-path fading results from the superposition of these signals as they travel from the source to the receiver, and can impair the radio channel. Frequency selective fading or "Rayleigh fading" is a combination of direct and out-of-phase reflected waves at the receiver that produces attenuated signals.

FIG. 1 illustrates an exemplary wireless communications system 2, such as a WCDMA (wideband code division multiple access) wireless mobile communication system, wherein a signal 4 is transmitted from a tower 6 to a surrounding area 8. As the signal enters the area 8, it is reflected off structures 8a within the area 8 (e.g., it bounces off buildings, billboards, etc. that may be within the area 8). A mobile phone 10 moving through the area 8 at a constant or variable velocity (e.g., the mobile phone 10 may be within a moving vehicle 12 passing through the area 8) directly receives the signal 4 and/or indirectly receives the signal via reflections 4a (also referred to as replicas 4a).

Figure 2:
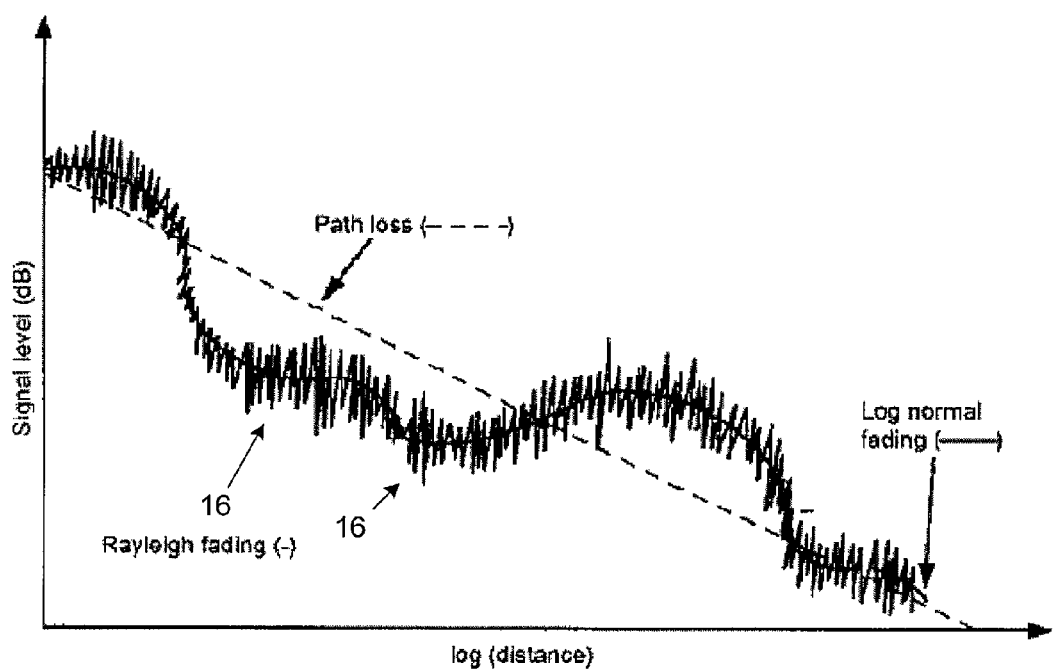
FIGS. 2, 3 and 4 are graphs of exemplary signal exhibiting various types of fading.
Figure 3:
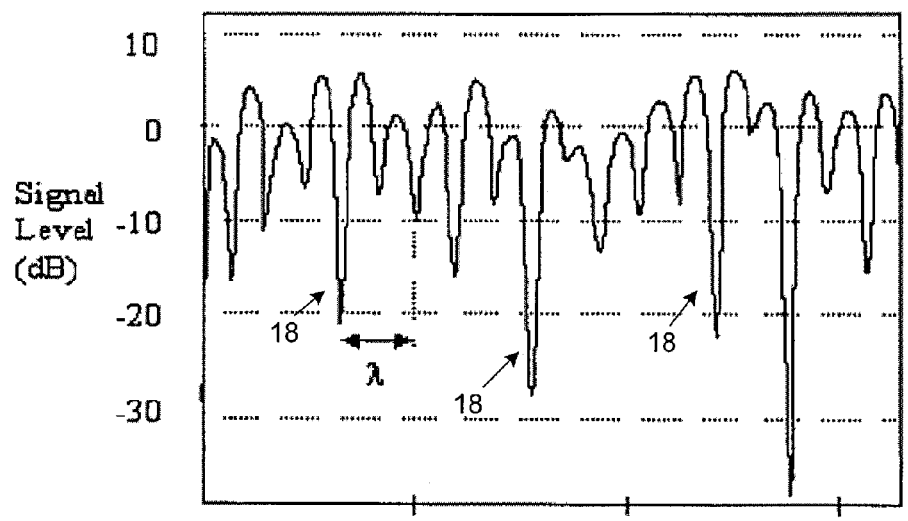

The mobile phone 10 includes a RAKE receiver having settable fingers for decoding the signals 4, 4a. In order to properly decode the signals 4, 4a, a delay time for each finger is set to correspond to one of the replicas 4a. The delay time typically is expressed in units of chip durations, where the chip is defined as the spread spectrum minimal-duration keying element. Due to signal fading, performance degradation can result from loss of signal-to-noise ration (SNR). FIG. 2 is a graph illustrating an exemplary signal experiencing different types of fading, including Rayleigh fading 16. FIG. 3 illustrates further detail of Rayleigh fading 16, wherein nulls 18 may be present on the signal. The magnitude of the nulls 18, which are caused by interference between two replica signals 4a, may be 20, 30 or even 40 dB in magnitude.

Figure 4:
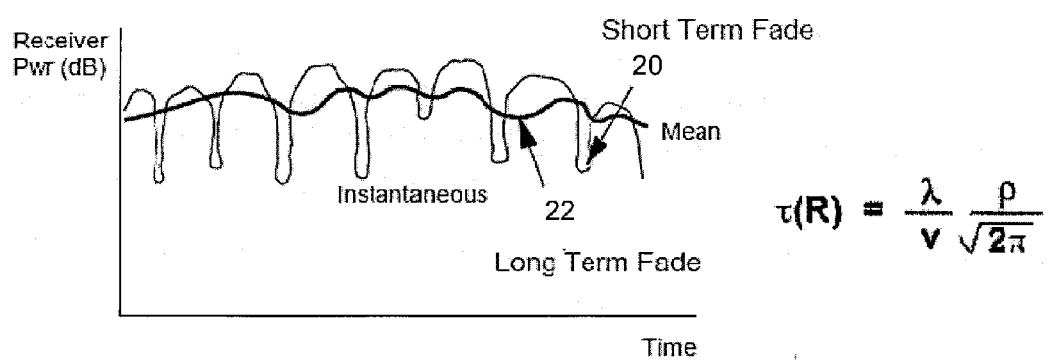

FIG. 4 illustrates both short term 20 (instantaneous) and long term 22 (mean level) fading. As velocity of the receiver increases, the distance between nulls 18 becomes very short (e.g., on the order of a few micro seconds). In other words, an increase in receiver velocity causes the frequency of the nulls 18 to increase during short term fade. As a result, the mean value of the signal drops, which can degrade performance of the communication system.

Rayleigh fading is caused in part from interference between two or more replica signals 4a that cancel each other. Rayleigh fading has a strong dependence on the frequency of the signal 4, 4a as well as the velocity of the receiver (e.g., the velocity of the mobile phone 10 relative to the tower 6). As velocity of the receiver increases, the distance between nulls decreases and performance suffers. By setting the fingers of the RAKE receiver to avoid searching in areas of the signal 4a where deep nulls 18 may be present, the performance of the communication system 2 can be enhanced.

More specifically, a time delay of the RAKE fingers may be set using the known frequency of the signal 4, 4a as well as the velocity of the mobile phone 10 (and thus the velocity of the RAKE receiver). The velocity may be determined using a transducer included in the mobile phone 10, wherein the transducer provides a signal indicative of velocity. The transducer can be an accelerometer, for example, wherein acceleration and deceleration are integrated with respect to time to obtain a velocity of the mobile phone 10. Alternatively, the mobile phone 10 may include a GPS receiver, wherein velocity is determined using a carrier-phase derived Doppler measurements or receiver generated Doppler measurements. Other means for measuring velocity of the mobile phone also are contemplated, as discussed below.

The average or mean duration of fade can be determined from Equation 1, wherein p depends on the frequency of the signal 4, 4a (β is determined during the synchronization process as the mobile phone is started/power up), v is the velocity of the receiver in meters per second relative to the base station(s), and R is the fade depth ratio (ratio of RMS in db). Using a transducer that provides data indicative of a velocity of the mobile phone 10, the average duration of fade can calculated. Then, using the average duration of fade, the time delay of the RAKE fingers can be set so as to avoid searching areas of the signal 4, 4a that may have deep nulls. As a result, SNR can be increased, thereby enhancing the performance of the communication channel.

$$ADF = \frac{\sqrt{2}\lfloor e^{R^2} - 1 \rfloor}{\beta v R} \qquad \text{Equation 1}$$

Figure 5:
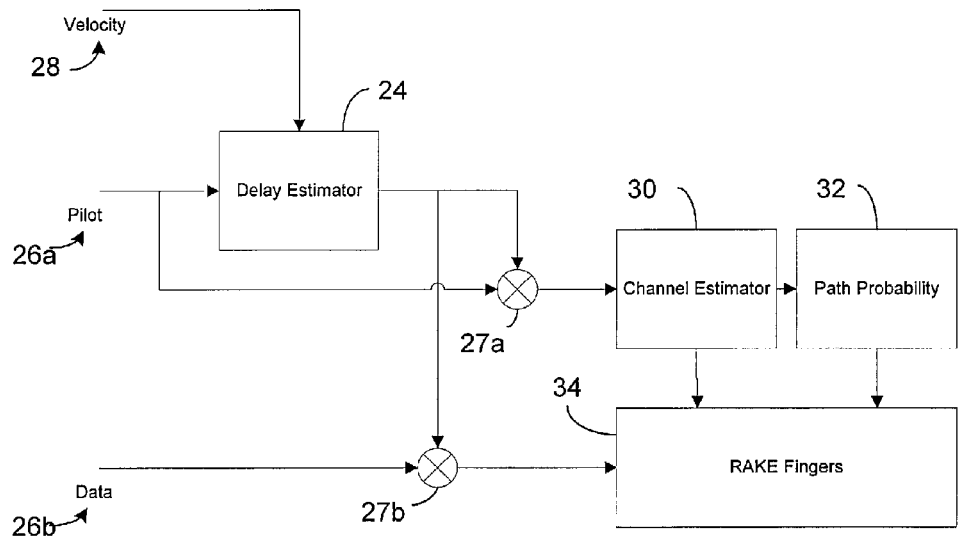
FIG. 5 is a block diagram illustrating an exemplary circuitry for setting the RAKE fingers in accordance with the invention.

For example, and with reference to FIG. 5, an exemplary circuit for setting the RAKE fingers is shown. A delay estimator circuit 24 receives a pilot channel 26a, as well as the velocity signal 28 as determined from data provided by the transducer. As is known by those having ordinary skill in the art, the pilot channel 26a is a time multiplexed channel that can be used to estimate the timing for signal demodulation. The delay estimator 24, using the pilot channel 26, the velocity 28 and equation 1, calculates the average duration of fade of the signal 4, 4a from the transmitter 6 to the mobile phone 10.

The output of the delay estimator 24 and the pilot channel 26 each are provided to respective inputs of a first correlator 27a. Similarly, a data channel 26b (which carries data such as voice data, video data, etc.) and the output of the delay estimator 24 are provided to a second correlator 27b. In simplistic terms, the correlators 27a and 27b provide a product of the respective inputs, and the outputs of the first and second correlators 27a and 27b are provided to the channel estimator 30 and RAKE fingers 34, respectively.

The channel estimator 30, based in the output from the first correlator 27a, estimates the number of received channels (e.g., the number of channels that contain data). Additionally, the path probability circuit 32 estimates the fading of the received signals due to intercede interference, for example. The number of estimated channels as determined by the channel estimator 30 and the fading as determined by the path probability circuit 32 then are used to set the RAKE fingers 34. Then, the correlated data signal (i.e., the output of the second correlator 27b) is used to extract data received on the data channel 26b, and the extracted data is further processed into meaningful information. As a result, the RAKE receiver will avoid nulls, the searching time for replica signals will be reduced, and only maximized replicas of the main carrier will be used to construct the signal.

Figure 6:
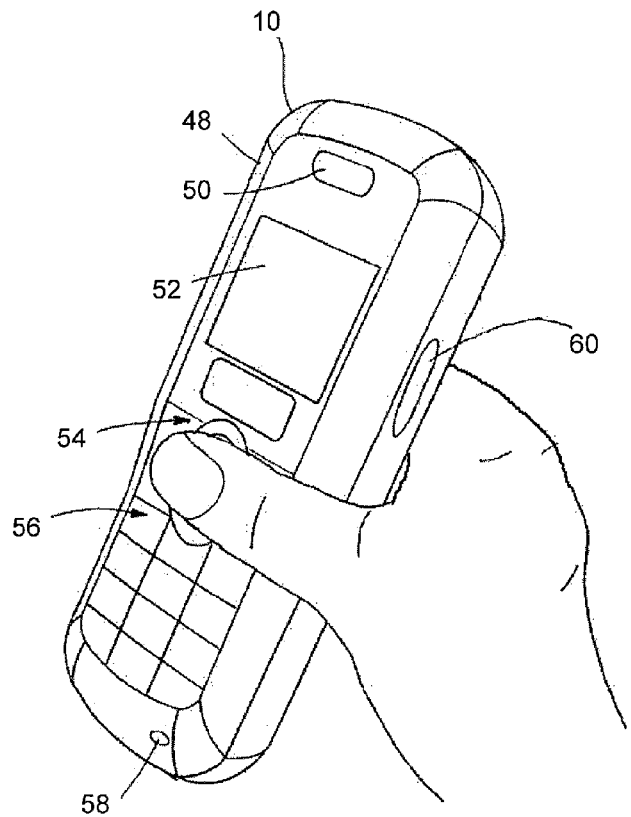
FIG. 6 is schematic illustration of an exemplary mobile phone.

Referring now to FIG. 6, a mobile phone 10 is shown as having a "brick" or "block" design type housing 48, but it will be appreciated that other type housings, such as, for example, claim shell or slide-type housings, may be utilized without departing from the scope of the invention. The mobile phone 10 includes housing 48 (sometimes referred to as a case), speaker 50, display 52, navigation switch and selection/function keys or switches 54, key pad 56, microphone 58, and volume control slide switch 60; these are illustrative and exemplary of parts of a typical mobile phone, but it will be appreciated that other parts that are similar or different in form and/or function may be included in the mobile phone 10. The mobile phones to which the invention pertains also may be of the types that have more or fewer functions, keys, etc., compared to those illustrated and described herein.

Figure 7:
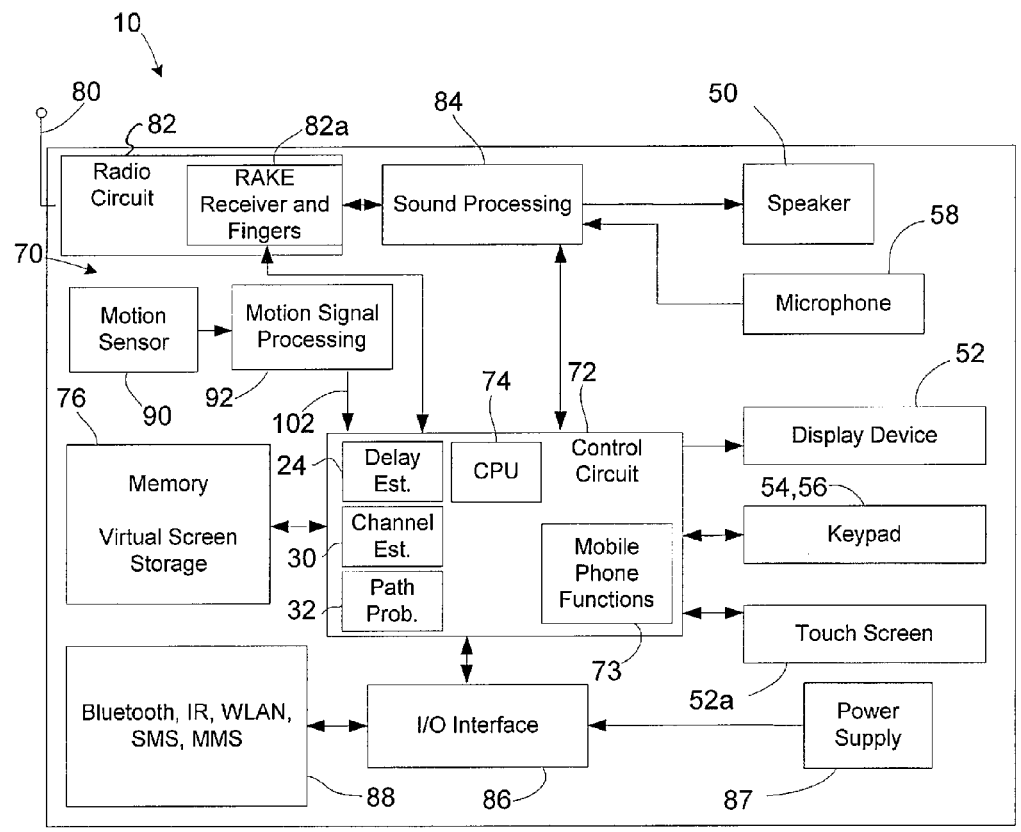
FIG. 7 is a schematic block diagram of a number of exemplary relevant portions of the respective mobile phone of FIG. 6 in accordance with the present invention.

As will be appreciated, the mobile phone 10 may function as a conventional mobile phone. The mobile phone 10 may have additional functions and capabilities that may be developed in the future. From a conventional point of view, the display 52 displays information to a user, such as operating state, time, phone numbers, contact information, various navigational menus, etc., which facilitate and/or enable the user to utilize the various features of the mobile phone. The display also may be used to view movies, images, or to play games, for example. Part or all of the display 52 may be a touch screen type device 52a (FIG. 7). The navigation and function keys 54 and the keypad 56 may be conventional in that they provide for a variety of user operations. For example, one or more of the function keys and navigation device 54 may be used to navigate through a menu displayed on the display 52 to select different phone functions, profiles, settings, etc., as is conventional. The keypad 56 typically includes one or more special function keys, such as, a "call send" key for initiating or answering a call, a "call end" key for ending or hanging up a call, and dialing keys for dialing a telephone number. Other keys included in the navigation and function keys 54 and/or keypad 56 may include an on/off power key, a web browser launch key, a camera key, a voice mail key, a calendar key, etc. The volume control switch 60 may be operated to increase or to decrease the volume of the sound output from the speaker 50. If desired, a sensitivity control also may be provided to change the sensitivity of the microphone 58 as it picks up sounds for transmission by the mobile phone 10. The mobile phone 10 may have more of fewer keys, navigation devices, etc., compared to those illustrated.

FIG. 7 represents a functional block diagram of an exemplary mobile phone, for example, the mobile phone 10. The representation also is similar to those of PDAs and/or other electronic equipment, as will be appreciated by those having ordinary skill in the art. The construction of the mobile phone 10, which is presented by way of example here, is generally conventional with the exception of the circuits associated with estimating the delay time for the RAKE fingers, as described in greater detail below. The various functions carried out by the parts represented in the functional block diagram of FIG. 7 may be carried out by application software within the mobile phone 10. However, it will be apparent to those having ordinary skill in the art that such operation can be carried out via primarily software, hardware, firmware, or a combination thereof, without departing from the scope of the invention.

The mobile phone 10 includes a primary control circuit 72 that is configured to carry out overall control of the functions and operations of the mobile phone 10, e.g., as is represented at block 73. The control circuit 72 may include a CPU 74 (central processor unit), microcontroller, microprocessor, etc., collectively referred to herein simply as CPU 74. The CPU 74 executes code stored in memory within the control circuit 72 (not shown) and/or in a separate memory 76 in order to carry out conventional operation of the mobile phone functions within the mobile phone 10. In addition, a delay estimator circuit 24, based on a velocity of the mobile phone 10, determines a time delay setting for the RAKE fingers such that the RAKE fingers do not search in areas where deep nulls are present in the signal, and the channel estimator circuit 30 and path probability circuit 32 set the RAKE fingers.

Continuing to refer to FIG. 7, the mobile phone 10 includes a conventional antenna 80, radio circuit 82, which includes a RAKE receiver and fingers 82a, and sound processing signal circuit 84, all of which are cooperative to send and to receive radio frequency (or other) signals in conventional manner. For an incoming signal, for example, the sound processing signal circuit 84 may include an amplifier to amplify the signal and to provide it to the speaker 50 so a user may hear the sound, and the sound processing signal circuit 84 also may use the same amplifier or another amplifier to amplify signals from the microphone 58 for transmitting thereof via the radio circuit 82 and antenna 80 to another mobile telephone, to a cellular phone tower, to a satellite, etc. Operation of the radio circuit 82, sound processing signal circuit 84, speaker and microphone, are under control of the control circuit 72, as is conventional.

The mobile phone 10 includes the display device 52, keypad 54, 56 (including the navigation device mentioned above), and the capability of a touch screen 52a, which may be part or all of the display device 52, and these are coupled to the control circuit 72 for operation as is conventional.

As is illustrated in FIG. 7, the mobile phone 10 includes an input/output interface 86, a power supply 87, and a short distance communications mechanism 88, for example a Bluetooth communications device, infrared (IR) communications device, or some other device. Another example of a short distance communications mechanism is wireless local area network (WLAN), and the invention also may use still other short distance communications mechanisms or devices that currently exist or may be developed in the future. The short distance communications mechanism 88 may transmit and receive signals using SMS (short message service), MMS (multimedia messaging service) or some other communications mechanism and protocol. Bluetooth, IR, WLAN communications for communicating over short distances between mobile phones are well known; other mechanisms may exist and/or may be developed in the future, and these may be utilized by and are included for use in the invention.

Figure 8:
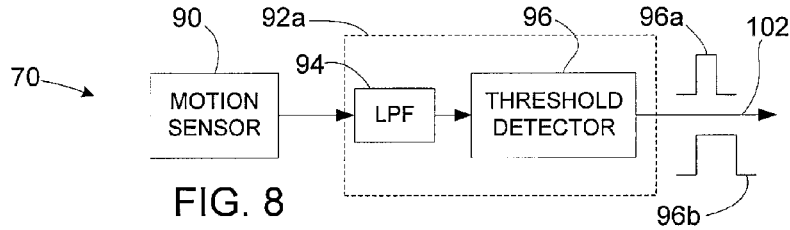
FIGS. 8, 9 and 10 are, respectively, schematic illustrations of exemplary motion transducers providing for motion detection based on threshold, amplitude, or frequency.
Figure 9:
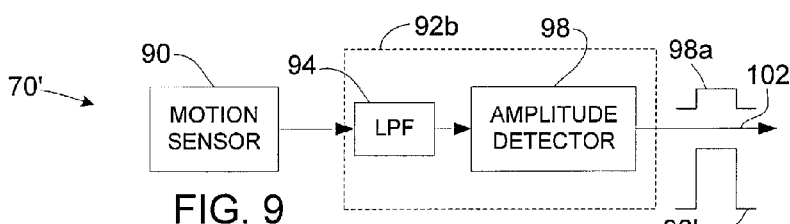
Figure 10:
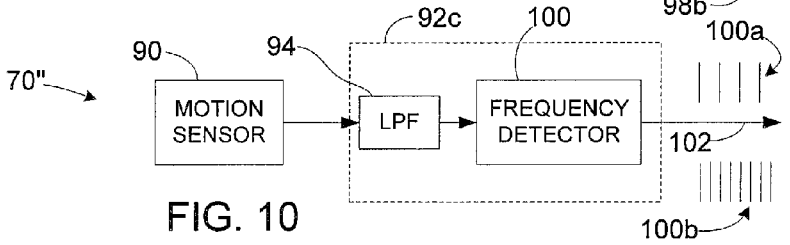

With further reference to FIGS. 8, 9 and 10, several examples of motion transducers 70, 70' and 70" are illustrated. The motion transducer 70 shown in FIG. 8 includes a motion sensor 90, for example, an accelerometer or an acceleration transducer. The motion transducer 70 also may include signal processing circuitry, for example, motion signal processing circuit 92, which is described below. An accelerometer may provide a signal output, e.g., an electrical signal, representing acceleration of the transducer. The accelerometer may be in the case or housing 48 of the mobile phone 10. An accelerometer is useful to produce signals representing motion occurring as the mobile phone is moved. The transducer may be a position sensor type transducer that may provide a signal output, e.g., an electrical signal that represents the motion of or changes in location of the mobile phone. Still another example of a transducer may be a GPS receiver, whereby the sensor provides a signal output representing a location or velocity of the mobile phone as determined using GPS satellites, for example.

It will be appreciated that a motion transducer may be any device, circuit or other mechanism or combination thereof that provides an indication that motion has been sensed and/or provides an indication of the character of the motion, such as, for example, acceleration, velocity, direction, directional change, rotation, or any other characterization of the motion. An example, as is mentioned above, is an accelerometer that provides an electrical output (or some other output) in response to acceleration. Another example is a velocimeter that provides an output representative of velocity. Still another example is a signal detector that responds to changes in electrical signals, radio frequency signals, or some other signals, such as amplitude or frequency or changes therein, Doppler shift, or some other discernible change that occurs due to motion.

The motion transducer 70, as is shown in respective embodiments of FIGS. 8, 9 and 10, also includes a motion signal processing circuit, which is designated generically 92 in FIG. 7 and is designated individually 92a, 92b, 92c, respectively, in FIGS. 8, 9 and 10. The motion sensor 90 produces an output indicative of motion of the mobile phone 10. This output is provided to the motion signal processing circuit 92 that processes and conditions the signal prior to being input to the control circuit 72. For example, the motion signal processing circuit 92 provides a motion signal to the control circuit 72 to indicate at least one of that motion has been detected, characteristics of that motion, e.g., duration of the motion, amplitude of the motion, frequency (e.g., changes of direction) of the motion, etc. and/or that motion has ceased. The motion signal processing circuit 92 may filter the output of the motion sensor 90 or otherwise may condition the output using known techniques such that the indication of motion or an appropriate signal to represent motion to the control circuit 72 only is provided in instances where appreciable movement (e.g., exceeding a predetermined velocity or continuous movement for at predetermined time period) of the mobile phone 10. Such motion is referred to as intended motion. The motion signal processing circuit 92 may block from the control circuit 72 signals representing brief or casual movement of the mobile phone 10, e.g., a dead zone where slight movement of the phone, such as a result of being handled by a stationary user, is not registered as an intended motion Therefore, the motion signal processing circuit 92 preferably requires that the output from the motion sensor 90 be maintained for at least a predetermined time, amplitude and/or frequency prior to issuing a motion indication, e.g., that intended motion has been detected, to the control circuit 72. Alternatively, the motion signal processing circuit 92 may provide inputs to the control circuit 72 and the control circuit 72 may include appropriate circuitry and/or program code to effect the desired filtering, e.g., as was just described, to avoid false indications of motion detection of a type that would result in unnecessary calculations for setting the RAKE fingers, for example.

With the above in mind, then, each of the exemplary motion signal processing circuits 92a, 92b, 92c shown in FIGS. 8, 9 and 10 includes a low pass filter 94 and either a threshold detector 96, amplitude detector 98 or frequency detector 100. In an another embodiment the motion signal processing circuit may include a combination of two or more of the detectors 96, 98, 100. The low pass filter 94 removes or blocks signals representing casual motion or noise or spurious signals representing brief, unintended movement of the mobile phone 10 or casual movement of the mobile phone, such as may occur during handling of the mobile phone. The threshold detector 96 is designed to output an appropriate motion signal on line 102, which is coupled as an input to the control circuit 72, when motion of a relatively long duration occurs, e.g., probably not due to casual motion, noise or the like. In response to such motion signal the delay estimator circuit 75 calculates the time delay settings for the RAKE fingers. The threshold detected by the threshold detector 96 may be represented by pulse width of signals input thereto, and the output therefrom may be representative of such pulse width, as is represented by the relatively short and long pulse width signals 96a, 96b. The signal provided on line 102 to the control circuit 72 may be of a shape, form, duration, etc., similar to the signals 96a, 96b, may be respective high or low signals, depending on the duration of the signals 96a, 96b, may be a digital signal value of a prescribed number of data bits in length, or may be of some other character that is suitable to effect a desired operation of the control circuit 72 depending on whether or not intended motion has been detected. As several examples, the cutoff or distinguishing duration of pulse widths representing the motion detected to distinguish between intended motion and casual motion or noise may be from about a fraction of a second to up to three or four seconds; these are just exemplary and the duration or pulse width of occurrence of such motion may be more or less.

As another example of motion signal processing circuit 92b, there is illustrated in FIG. 9 a low pass filter 94 and an amplitude detector 98. The amplitude detector 98 provides an output on line 102, e.g., of a type suitable for the control circuit 72 to understand and to operate based on whether intended or prescribed motion has been detected or has not been detected. For example, casual motion or noise may produce a relatively low amplitude signal 98a as input or output from the amplitude detector; and intended or prescribed motion may produce a relatively larger amplitude signal 98b as input or output to/from the amplitude detector 98.

Still another example of motion signal processing circuit 92c is illustrated in FIG. 10 as a low pass filter 94 and a frequency detector 100. The frequency detector 100 provides an output on line 102, e.g., of a type suitable for the control circuit 72 to understand and to operate based on whether intended or prescribed motion has been detected or has not been detected. For example, casual motion or noise may produce a relatively low frequency signal 100a or respond to a relatively low frequency signal 100a, respectively, as output from or input to the amplitude detector. A relatively higher frequency signal 100b input to and/or output from the frequency detector 100 representing detection of intended motion, may be provided to the control circuit 72.

Figure 11A:
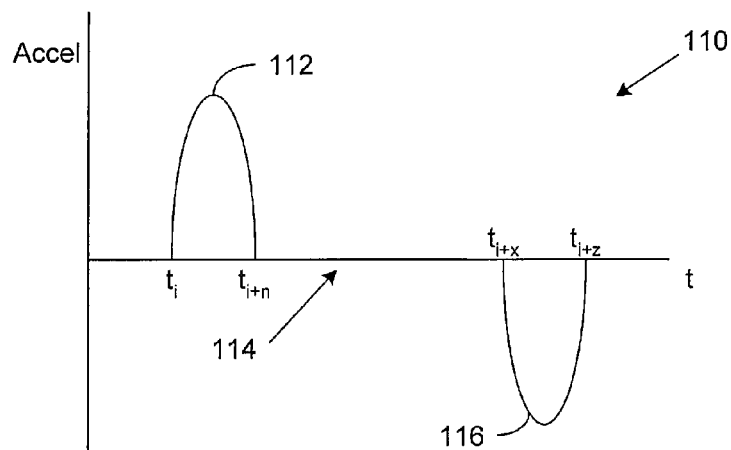
FIGS. 11A-11B are exemplary signals that may be generated using an accelerometer as the motion sensor.

Referring now to FIG. 11A, there is shown an exemplary signal 110 that may be generated by a motion sensor 90 embodied as an accelerometer. Initially, the mobile phone 10 (and thus the accelerometer) is assumed to be at rest, and at some time $t_i$ later, the mobile phone is moved. The acceleration of the mobile phone 10 is detected by the accelerometer, which generates a first pulse 112 during the acceleration period. As can be seen, the first pulse 112, which is non-linear, represents variable acceleration of the mobile phone 10. As will be appreciated, constant acceleration may be represented by linear functions (e.g., a triangular pulse). At some time $t_{i+n}$ later, acceleration is no longer detected, which is indicated by no signal activity in the region 114 between the first pulse 112 and a second pulse 116. During this period, the motion signal processing circuit 92 presumes that motion is continuing at a stead state velocity, as described below. At some time $t_{i+x}$ later, the accelerometer detects deceleration and generates the deceleration pulse 116, and at $t_{i+z}$, motion of the mobile phone 10 is no longer occurring. As will be appreciated by those skilled in the art, the signals generated by the motion sensor 60 may take other forms based on the type of motion sensor employed in the mobile phone 10, and the signal of FIG. 11A is merely exemplary.

Figure 11B:
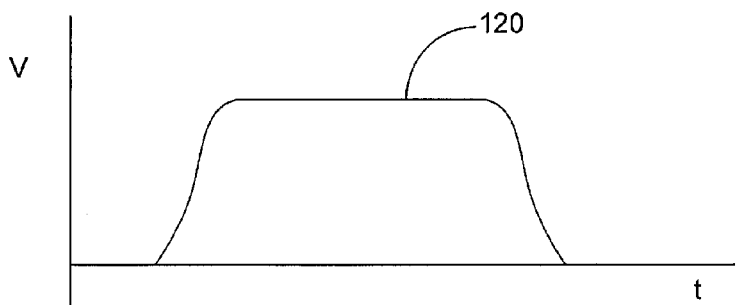

With further reference to FIG. 11B, there is shown an exemplary velocity profile 120 that may be generated by the motion signal processing circuit 92 in response to the data from the accelerometer. The velocity profile 120 can be generated, for example, by integrating the acceleration and deceleration as detected by the accelerometer with respect to time. As can be seen in FIG. 11B, the motion signal processing circuit 92, based on the integral of the acceleration, presumes that the mobile phone 10 is moving at a constant velocity during the period between the first pulse 112 (the acceleration pulse) and the second pulse 114 (the deceleration pulse). Using the velocity of motion, the delay estimator circuit 24 calculates the time delay for the RAKE fingers using Equation 1, and the RAKE fingers are set accordingly.

Figure 12:
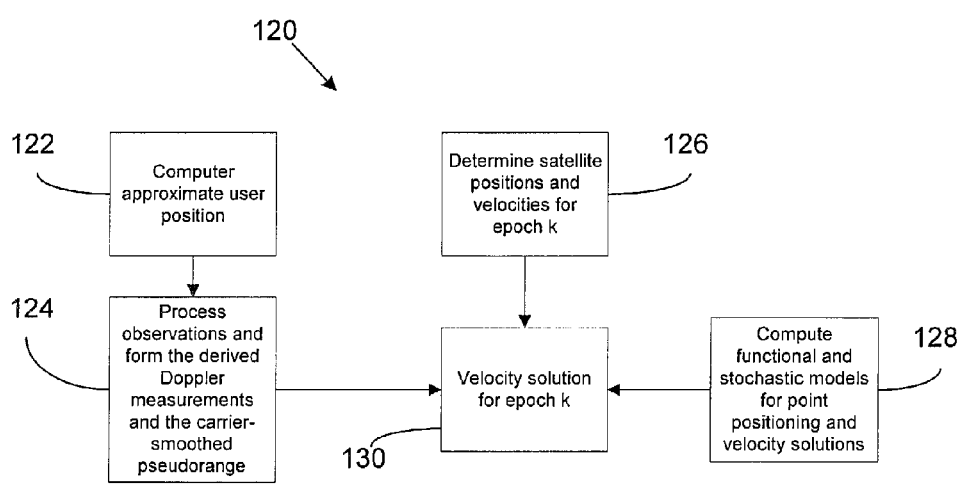
FIG. 12 is a block diagram illustrating exemplary steps for calculating velocity using a GPS receiver.

Another example of a transducer that can be used to determine a velocity of the mobile phone 10 is a GPS receiver. Determining velocity using a GPS sensor is well known in the art and, therefore, will only be briefly discussed herein. FIG. 12 shows a block diagram 120 that provides exemplary steps for determining velocity using a GPS receiver. The block diagram includes a number of process blocks arranged in a particular order. As should be appreciated, many alternatives and equivalents to the illustrated steps may exist and such alternatives and equivalents are intended to fall within the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

Beginning at step 122, an approximate user position is calculated. For velocity determination, the approximate user position at the present epoch, previous epoch and next epoch are obtained. Both code and phase measurements can be used to estimate user position. Preferably, the error in user position is less than 100 meters, and more preferably, les than 10 meters.

At step 124, carrier-phase-derived Doppler and carrier-smoothed pseudoranges are formed. The observation equation for velocity determination is shown in Equation 2, where B is the receiver clock drift, v is the satellite velocity vector, V is the receiver velocity vector, $\epsilon$ is the error in observations as summarized in Equation 3 (b, I, T and e are the satellite clock drift, ionospheric delay rate, tropospheric delay rate, and receiver system noise, respectively), and h represents the directional cosine vector between the receiver and satellite, and is given by Equation 4, where X and u represent the satellite and receiver positions, respectively.

$$\Phi_k^j = h_k^j(v_k^j - V_k) + B_k + \varepsilon_k^j \qquad \text{Equation 2}$$

$$\varepsilon_k^j = -b_k^j + I_k^j + T_k^j + e_k \qquad \text{Equation 3}$$

$$h_k^{jT} = \frac{(X_k^j - u_k)}{|X_k^j - u_k|} \qquad \text{Equation 4}$$

At step 126, estimates of the satellite positions and velocities for epoch k are obtained. These estimates are obtained using the satellite ephemeris in the navigation message, for example.

At step 128, the functional and stochastic models for point positioning and velocity solutions are calculated. From equation 2, the functional model for velocity determination can be obtained, as given by Equation 5. Equations 6, 7 and 8 define the variables of equation 5, wherein H is a design matrix including all directional cosine vectors between the receiver and satellite, and 1 is a column vector having 1 ws as its elements.

$$\Phi_k' = G_k \cdot x_k + \epsilon_k \qquad \text{Equation 5}$$

$$\Phi_k' = \Phi_k - H_k v_k \qquad \text{Equation 6}$$

$$G_k = [H_k 1] \qquad \text{Equation 7}$$

$$x_k = [-V_k^T B_k]^T \qquad \text{Equation 8}$$

Assuming no temporal correlation in the carrier phase observations, and no correlation among the receiver channels, we have Equation 9 and 10.

$$Q_{\Phi_k'} = \begin{bmatrix} \sigma_{\Phi_k^1}^2 & & & \\ & \sigma_{\Phi_k^2}^2 & & \\ & & \ddots & \\ & & & \sigma_{\Phi_k^n}^2 \end{bmatrix} \qquad \text{Equation 9}$$

$$\sigma_{\Phi_k^j}^2 = \frac{1}{4 \cdot \Delta t^2}\left(\sigma_{\Phi_{k+\Delta t}^j}^2 + \sigma_{\Phi_{k-\Delta t}^j}^2\right) \qquad \text{Equation 10}$$

Further, the variance of the first order central difference approximation of the carrier-phase rate can be used to fit the exponential function as shown in Equation 11, where ELEV represents the elevation angle of the satellite.

$$\sigma^2_{\phi^j_k} = a_0 + a_1 \exp\left(\frac{a_2}{ELEV^j_k}\right) \qquad \text{Equation 11}$$

At step 130, the velocity solution is obtained for epoch k, and the velocity is provided to the delay estimator circuit 24. Using the velocity, the delay estimator circuit 24 calculates the time delay for the RAKE fingers using Equation 1, and the RAKE fingers are set as discussed herein.

Further details regarding velocity determination using a GPS receiver can be found in the publication titled A GPS VELOCITY SENSOR by Serrano et al., ION NTM 2004, Jan. 26-28, 2004, the contents of which is incorporated by reference in its entirety.

A person having ordinary skill in the art of computer programming and applications of programming for mobile phones would be able in view of the description provided herein to program a mobile phone 10 to operate and to carry out the functions described herein. Accordingly, details as to the specific programming code have been omitted for the sake of brevity. Also, while software in the memory 76 or in some other memory of the mobile phone 10 may be used to allow the mobile phone to carry out the functions and features described herein in accordance with the preferred embodiment of the invention, such functions and features also could be carried out via dedicated hardware, firmware, software, or combinations thereof, without departing from the scope of the invention.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, or device. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electronic equipment, comprising:
   a RAKE receiver for receiving a signal, said receiver including at least one finger having a settable time delay;
   a transducer operable to provide a signal indicative of motion of the electronic equipment; and
   a delay estimator circuit operative to calculate a duration between fading nulls of a signal received by the RAKE receiver based on the motion signal, wherein the time delay of the at least one finger is set based on the duration between fading nulls.

2. The electronic equipment of claim 1, wherein the duration between fading nulls is the average duration of fade (ADF) and is calculated using the formula $$ADF = \frac{\sqrt{2}\lfloor e^{R^2} - 1 \rfloor}{\beta v R},$$

wherein R is the fade depth ratio, v is the velocity of the receiver, and $\beta$ is characteristic of a frequency of the received signal.

3. The electronic equipment of claim 1, wherein the time delay of the at least one finger is set such that the at least one finger avoids searching in areas of the signal where fading nulls are present that have a magnitude greater than a predefined level.

4. The electronic equipment of claim 1, further comprising a path probability circuit operative to receive the calculated duration between fading nulls and to set the time delay of the at least one finger based on the duration between fading nulls.

5. The electronic equipment of claim 1, further comprising a motion signal processing circuit operable to determine a velocity of the electronic equipment from the motion signal.

6. The electronic equipment of claim 5, wherein the transducer is operable to generate a motion signal that corresponds to acceleration and/or deceleration of the electronic equipment.

7. The electronic equipment of claim 5, said motion signal processing circuit comprising a signal conditioning circuit to filter out signals that do not meet a predetermined threshold.

8. The electronic equipment of claim 7, said signal conditioning circuit comprising a low pass filter.

9. The electronic equipment of claim 5, wherein the motion signal processing circuit is operative to provide a motion signal indicative of duration of the motion, amplitude of the motion, and/or frequency of the motion.

10. The electronic equipment of claim 9, wherein the motion signal processing circuit includes at least one of a low pass filter, a threshold detector, an amplitude detector or a frequency detector.

11. The electronic equipment of claim 1, said transducer comprising an accelerometer, a velocimeter, a GPS receiver or a signal detector.

12. The electronic equipment of claim 1, said transducer operable to detect at least one of acceleration, velocity, position, rotation or proximity.

13. The electronic equipment of claim 1, wherein said electronic equipment is a mobile phone.

14. The electronic equipment of claim 1, wherein said electronic equipment is at least one of a personal audio device, a personal video device or a personal digital assistant.

15. A method of setting a time delay for at least one finger of a RAKE receiver in an electronic device, comprising:
   obtaining from a transducer of the electronic device a signal indicative of motion of the electronic device;
   calculating a duration between fading nulls of a signal received by the RAKE receiver based on the motion signal; and
   setting a time delay of the at least one finger based on the duration between fading nulls.

16. The method of claim 15, wherein calculating the duration between fading nulls includes calculating an average duration of fade (ADF) as the duration between fading nulls, the ADF being calculated using the formula $$ADF = \frac{\sqrt{2}\left[e^{R^2}-1\right]}{\beta v R},$$

wherein R is the fade depth ratio, v is the velocity of the receiver, and $\beta$ is characteristic of a frequency of the received signal.

17. The method of claim 15, wherein setting includes setting the time delay such that the at least one finger avoids searching in areas of the signal where fading nulls are present that have a magnitude greater than a predefined level.

18. The method of claim 15, wherein obtaining from the transducer of the electronic device a signal indicative of a motion of the electronic device includes:
   generating a motion signal that corresponds to acceleration and/or deceleration of the electronic device; and
   determining a velocity of the electronic device from the motion signal.

19. The method of claim 15, wherein obtaining from the transducer of the electronic device a signal indicative of a motion of the electronic device includes using a GPS receiver to obtain the signal indicative of motion.

20. The method of claim 15, wherein obtaining from the transducer of the electronic device a signal indicative of a motion of the electronic device includes filtering out signals that do not meet a predetermined threshold.

21. A non-transitory computer readable storage medium having an executable program stored thereon for setting a time delay for at least one finger of a RAKE receiver in an electronic device, wherein the program instructs a processor to perform the following steps:
   obtain from a transducer of the electronic device a signal indicative of motion of the electronic device;
   calculate a duration between fading nulls of a signal received by the RAKE receiver based on the motion signal; and
   set a time delay of the at least one finger based on the duration between fading nulls.

* * * * *

UNITED STATES PATENT AND TRADEMARK OFFICE
CERTIFICATE OF CORRECTION

| | | |
|---|---|---|
| PATENT NO. | : 7,848,388 B2 | Page 1 of 1 |
| APPLICATION NO. | : 11/463028 | |
| DATED | : December 7, 2010 | |
| INVENTOR(S) | : Bogdan Tudosoiu | |

It is certified that error appears in the above-identified patent and that said Letters Patent is hereby corrected as shown below:

Column 7, Line 20; "intercede" should be
-- intercode --.

Signed and Sealed this
Twenty-second Day of February, 2011

David J. Kappos
*Director of the United States Patent and Trademark Office*